United States Patent [19]
Brackett

[11] Patent Number: 5,836,812
[45] Date of Patent: Nov. 17, 1998

[54] PORTABLE ANIMAL CARCASS CARRIER

[76] Inventor: Timothy J. Brackett, R.R. 1, Box 119C, Oakley, Ill. 62552

[21] Appl. No.: 928,614

[22] Filed: Sep. 12, 1997

[51] Int. Cl.[6] .................................................. A22B 15/00
[52] U.S. Cl. .......................... 452/187; 452/185; 294/140
[58] Field of Search ................................... 452/187, 185, 452/189, 125; 294/140, 141

[56] References Cited

U.S. PATENT DOCUMENTS

| | | | |
|---|---|---|---|
| 2,931,629 | 4/1960 | Keller | 452/187 |
| 3,752,525 | 8/1973 | Hanna et al. | 452/187 |
| 4,317,257 | 3/1982 | Engel | 452/187 |
| 4,529,240 | 7/1985 | Engel | 452/187 |
| 5,336,124 | 8/1994 | Garside | 452/187 |
| 5,482,501 | 1/1996 | Frits | 452/187 |

FOREIGN PATENT DOCUMENTS 614287  6/1935  Germany .............................. 452/187

*Primary Examiner*—Willis Little
*Attorney, Agent, or Firm*—Philip L. Bateman

[57] ABSTRACT

A portable animal carcass carrier enables two men to easily carry an animal carcass across difficult terrain. The carrier contains a multi-section pole from which the carcass is suspended when the ends of the pole are supported on the shoulders of the men. The pole contains pads at each end for cushioning the shoulders. The carrier also contains three straps for attachment to the carcass and for placement over and across the pole. The first strap contains two hooks for inserting into the hind legs of the carcass, the second strap contains two loops for securing the front legs of the carcass, and the third strap contains a single loop for securing the head of the carcass.

8 Claims, 2 Drawing Sheets

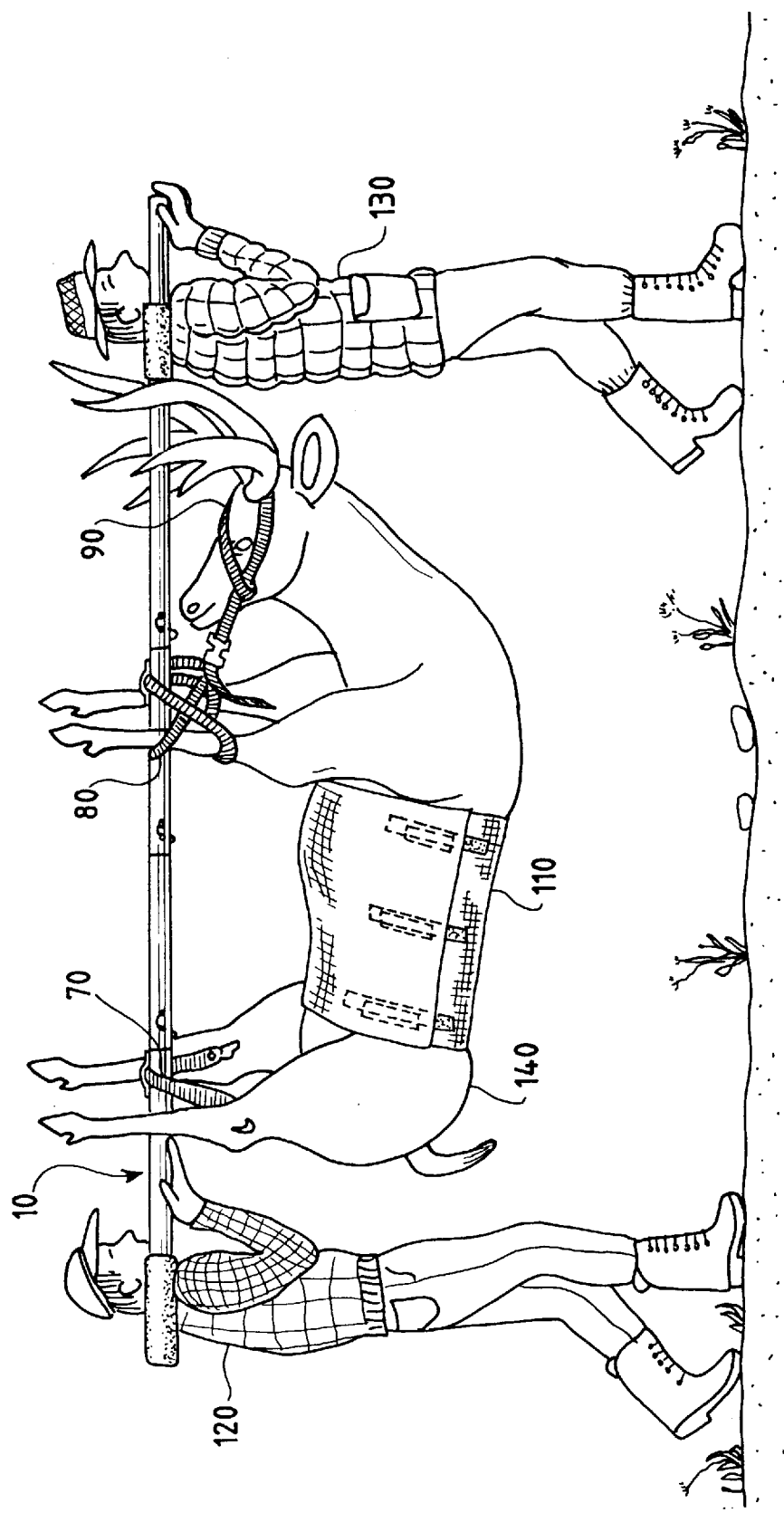

PORTABLE ANIMAL CARCASS CARRIER

FIELD OF THE INVENTION

This invention relates to animal carcass carriers. More particularly, this invention relates to animal carcass carriers of the type that are borne by two persons.

BACKGROUND OF THE INVENTION

Deer hunting is an especially popular type of hunting. Each year in the State of Illinois alone, about 100,000 people hunt deer and about 140,000 deer are taken. There are several reasons for the popularity of deer hunting. First, deer are prized for the taste of their meat, their relatively large size, and the beauty and grandeur of their bodies in trophy displays. Second, deer hunting is a very challenging form of hunting because deer live in densely wooded areas and because their excellent senses of eyesight, hearing, and smell make it is very difficult to approach deer close enough to shoot.

When a deer is taken, the body is immediately field dressed by removing the internal organs from the trunk cavity. While field dressing significantly reduces the weight of the carcass, the carcass can still weigh up to about 175 pounds. The field-dressed deer carcass is then carried or dragged by the hunter(s) to a motorized vehicle, such as a truck, automobile, or all-terrain vehicle. Because most deer are taken at remote locations where no motorized vehicle can go, it is often necessary for the hunter(s) to carry or drag the deer carcass some distance through densely wooded and hilly terrain. Transporting a deer carcass under such conditions is very difficult, even for several strong and physically fit hunters.

Several different carriers have been disclosed to help in the transportation of a field-dressed deer carcass. It has been common practice since prehistoric times to suspend an animal carcass from a wooden pole that is supported on the shoulders of two or more men. A modern version of such a pole is disclosed in Brown, U.S. Pat. No. Des. 359,391, issued Jun. 20, 1995. The Brown carrier is a pole having two segment, one of which is smooth and the other of which has a cross-section containing multiple protuberances emanating radially outward. The materials of construction and intended use of the Brown carrier are not disclosed. Welk, U.S. Pat. No. 5,145,224, issued Sep. 8, 1992, discloses a deer carcass dragging device. The Welk device can be used by one or two hunters. Dragging a deer carcass is very difficult in densely wooded areas. Dragging a carcass along the ground also damages the hide and the meat of the carcass.

Accordingly, a demand exists for a portable animal carcass carrier that is compact, lightweight, easily assembled, and that enables two hunters to easily carry a field-dressed deer or other animal carcass some distance through difficult terrain without damaging the hide or the meat.

SUMMARY OF THE INVENTION

The general object of this invention is to provide an improved portable animal carcass carrier. More particular objects are to provide a portable animal carcass carrier that is compact, lightweight, easily assembled, and enables two hunters to easily carry a field-dressed deer or other animal carcass some distance through difficult terrain without damaging the hide.

I have invented an improved portable carrier for an animal carcass having two hind legs, two front legs, and a head. The carrier comprises: (a) a multi-section pole having a front end and a rear end from which the carcass is suspended when the ends of the pole are supported on the shoulders of two standing men, the pole having a length of about 5 to 15 feet, a pad at the rear end of the pole for cushioning the shoulder of the man supporting the rear end of the pole, and a pad near the front end of the pole for cushioning the shoulder of the man supporting the front end of the pole; (b) a first strap having hooks at each end, the hooks adapted for inserting into the hind legs of the carcass, and the strap adapted for placement over and across the pole to suspend the hind legs of the carcass; (c) a second strap having loops at each end, the loops adapted for connection to the front legs of the carcass, and the strap adapted for placement over and across the pole to suspend the front legs of the carcass; and (d) a third strap having a loop at one end, the loop adapted for connection to the head of the carcass, and the strap adapted for placement over and across the pole to suspend the head of the carcass.

The portable animal carcass carrier of this invention is compact, lightweight, easily assembled, and enables two hunters to easily carry a field-dressed deer or other animal carcass some distance through difficult terrain where no motorized vehicle can go without damaging the hide or the meat.

BRIEF DESCRIPTION OF THE DRAWINGS

FIG. 2 is a perspective view of the carrier being used to transport a deer carcass by two hunters.

DETAILED DESCRIPTION OF THE INVENTION

Figure 1:
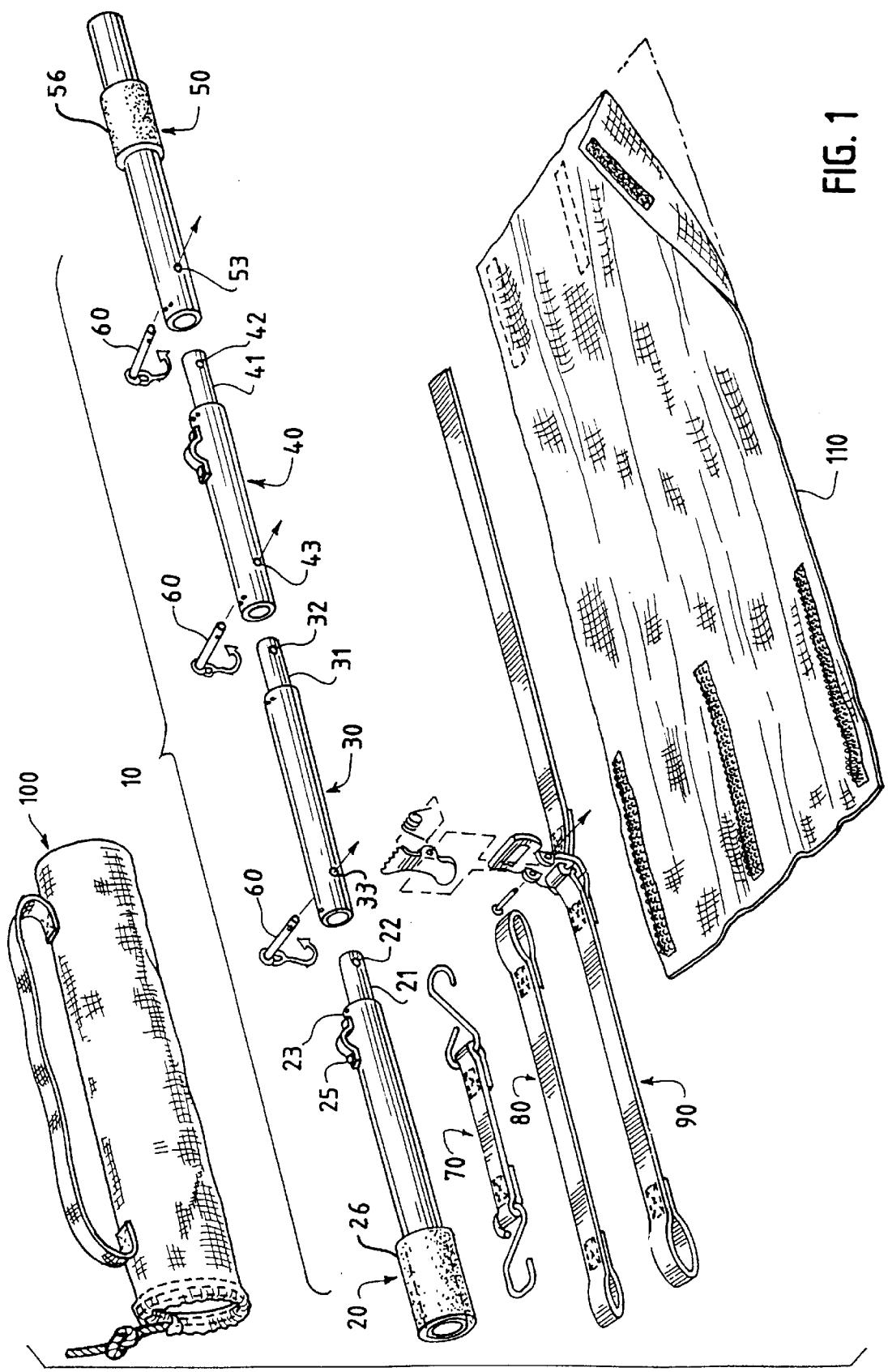
FIG. 1 is an exploded top perspective view of the carrier of this invention.

This invention is best understood by reference to the drawings. Referring to FIG. 1, the preferred embodiment of the animal carcass carrier includes a pole 10 made of four inter-locking sections: a rear section 20, a rear middle section 30, a front middle section 40, and a front section 50. The sections are held together by fasteners 60. The carrier also includes a hind legs strap 70, a front legs strap 80, and a head strap 90. Optional components include a container 100 and a carcass trunk wrap 110. In FIG. 2, the carrier is shown assembled and in use by two hunters 120 and 130 carrying a deer carcass 140.

The overall length of the pole is generally about 5 to 15 feet. The pole is long enough so that the animal carcass being carried does not interfere with the movement of the two hunters supporting the carrier. If the pole is significantly longer than required for freedom of movement, the pole is heavier and more cumbersome than necessary. The preferred length of the pole depends on the size of the animal carcass to be carried. For a full grown deer carcass, the preferred overall length of the pole is about 7 to 10 feet, most preferably about 8 to 9 feet.

The pole is constructed of a strong lightweight material, such as metal pipe, fiberglass, wood, or the like. The pole generally has an outside diameter of about one to three inches. The most preferred pole material is schedule 40 aluminum pipe having an outside diameter of about 1.5 inches because of its strength, freedom from rust, and light weight. The color of the pole is a matter of choice. To reduce the risk of being accidentally shot by other hunters, it is preferable for the pole to be of a bright color that contrasts with the greens and browns of wooded areas. The preferred bright colors are blaze orange and red.

The pole is made of multiple sections so it can be disassembled and stored compactly when not in use. The number of sections is a matter of choice depending on the overall length of the pole and the desired length of the individual pole sections. The number of sections is generally about two to six and the preferred number is three or four. The length of the individual pole sections depends, of course, on the overall length and the number of sections. The pole sections are preferably about 1.5 to 3 feet long, not including any portion that overlaps or fits within an adjacent section.

The pole sections are easily connected and disconnected. A variety of connection mechanisms are known and suitable, including mating threads, couplers, or the like. The preferred mechanism is a sleeve that is permanently attached to one section and temporarily attached to the adjacent section. This mechanism is inexpensive and produces very strong joints. In the preferred embodiment shown in FIG. 1, each section except for the front section has a permanently attached sleeve. The sleeves 21, 31, and 41 are constructed of 12-inch-long schedule 40 aluminum pipes having an outside diameter of about 1.25 inches. The sleeves fit snugly within their respective pole sections with about half of the sleeve inside the section and about half extending out of the section. Each sleeve is permanently held in place in its section with tension pins, pop rivets, nuts and bolts, welding, adhesives, or the like. Each sleeve is temporarily secured in place in the adjacent section with a fastener. A preferred fastener is a locking pin having a bolt portion and an attached semi-circular locking clip. The bolt portion passes through two pair of aligning holes (22 and 33, 32 and 43, and 42 and 53) in the pole sections. Clevis pins and cotters are also suitable fasteners, but they are more likely to be lost than locking pins.

To ensure the pole sections are connected in the correct order, mating marks are preferably placed on the top of the sections. In FIG. 1 it can be seen that the rear section and the rearward end of the rear middle section have a single mark (23 and 34) that are adjacent each other when the two pole sections are connected. Similarly, the rear middle section and the front middle section have double marks and the front middle section and the front section have triple marks.

It is preferred for the pole to contain clamps that secure the straps in position. If no clamps are present, the straps may slide on the pole and the animal carcass may move. The movement of the animal carcass shifts the balance of weight on the pole and can interfere with the movement of the hunters supporting the carrier. In the preferred embodiment shown in FIGS. 1 and 2, the rear section contains clamp 25 and the front middle section contains clamp 45. The hind legs strap is secured on the rear section clamp and the front legs strap is secured on the front section clamp, as seen in FIG. 2.

The rear section of the pole contains a pad 26. The pad cushions the shoulder of the man supporting the rear end of the pole by distributing the weight across a greater area of the shoulder. In the preferred embodiment, the pad is made of a cylindrical piece of foam rubber that encompasses the pole and has a thickness of about 0.75 inches and a length of about 8 inches. Larger foam pads are suitable, but they unnecessarily add to the bulk and cost of the carrier. Molded plastic pads that conform to the shape of the shoulder are also suitable. The front section of the pole contains a similar pad 56. The front end of the front pad is preferably located about 6 inches from the front end of the pole so it is centered over the shoulder of the man supporting the front end of the pole. The front pad is preferably movable so it can be centered exactly on the shoulder. As seen in FIG. 2, the man supporting the front end of the pole holds the front of the pole in one hand.

The hind legs strap is attached to the hind legs of the animal carcass and used to suspend the hind legs over the pole. The hind legs strap is made of nylon webbing, rope, chain, wire, or the like. In the preferred embodiment, the hind legs strap is a section of nylon webbing having a length of about 8 inches with two S-hooks secured to the ends. The hooks are sized and shaped to be easily inserted into slits made between the bone and tendon of the hind legs of an animal carcass. A slit at this location is commonly made for tagging the carcass in compliance with hunting laws. When the pole is equipped with a rear clamp, the hind legs strap is preferably secured to the clamp, either before or after attachment to the hind legs.

The front legs strap is attached to the front legs of the animal carcass and used to suspend the front legs over the pole. The front legs strap is made of the same type of material used for the hind legs strap. An S-hook is not suitable for the front legs strap because the front legs of an animal carcass do not have the same bone-tendon structure as the hind legs. Accordingly, the front legs strap is typically looped and secured around the legs. Each loop in the strap is made with a sewn loop, knot, clamp, or the like. In the preferred embodiment, the front legs strap is a section of nylon webbing having a length of about two feet with loops sewn at the ends. The front legs strap is attached to the front legs by first feeding a portion of the strap through the sewn loop to create a tension loop. The tension loop is then slipped over the front leg of the animal carcass and tightened just above the knee joint. When the pole is equipped with a front clamp, the front legs strap is preferably secured to the clamp, either before or after attachment to the front legs.

The head strap is attached to the head of the animal carcass and passed over the pole to suspend the head. The head strap is made of the same type of material used for the front and hind legs straps. In the preferred embodiment, the head strap contains two sections of nylon webbing, each of which is attached at one end to a common clamp. The free end of the first section of webbing contains a sewn loop. The loop is formed into a tension loop and then tightened around the antlers or the head of the carcass. The free end of the second section of webbing is looped around the front legs above the pole and then secured in the clamp of the strap.

Although not essential, it is preferred for the animal carcass carrier to include a container for the pole sections and straps. A lightweight carrier made of canvass or the like makes it much easier to transport the carrier to the place where the animal carcass is located. The color of the carrier is a matter of choice. If the primary goal is to avoid detection, the carrier is preferably green, brown, or camouflaged. If the primary goal is to avoid being shot at, the carrier is preferably brightly colored. It is also preferable for the carrier to include a sheet of brightly colored material to wrap around the trunk of the carcass. The sheet is made of nylon, polyethylene, canvas, fabric with a plastic coating, or the like and is fastened in place with Velcro hook and loops, buttons, clamps, or the like. The sheet further reduces the risk of being accidentally shot by other hunters and also encloses the trunk cavity to prevent contamination.

The preferred embodiment of the animal carcass carrier is compact, weighs less than about ten pounds, and is easily carried by the hunter to the desired location. When an animal has been killed and field dressed, the carrier is assembled and the carcass suspended in position in only a few minutes. By using the carcass carrier of this invention, two hunters are able to easily carry an animal carcass a great distance over difficult terrain without any damage to the carcass. The animal carcass carrier is also useful in transporting fish, birds, and inanimate objects.

I claim:

1. A portable carrier for an animal carcass having two hind legs, two front legs, and a head, the carrier comprising:

(a) a multi-section pole having a front end and a rear end from which the carcass is suspended when the ends of the pole are supported on the shoulders of two standing men, the pole having a length of about 5 to 15 feet, a pad at the rear end of the pole for cushioning the shoulder of the man supporting the rear end of the pole, and a pad near the front end of the pole for cushioning the shoulder of the man supporting the front end of the pole;

(b) a first strap having hooks at each end, the hooks adapted for inserting into the hind legs of the carcass, and the strap adapted for placement over and across the pole to suspend the hind legs of the carcass;

(c) a second strap having loops at each end, the loops adapted for connection to the front legs of the carcass, and the strap adapted for placement over and across the pole to suspend the front legs of the carcass; and (d) a third strap having a loop at one end, the loop adapted for connection to the head of the carcass, and the strap adapted for placement over and across the pole to suspend the head of the carcass.

2. The carrier of claim 1 wherein the pole contains two clamps for securing the point where the first and second straps pass over and across the pole.

3. The carrier of claim 2 wherein the pole is made of aluminum pipe.

4. The carrier of claim 3 wherein the pole sections have sleeves that fit within the adjacent pole section and are secured in place by locking pins.

5. The carrier of claim 4 wherein the pads at the front and rear ends of the pole are cylindrical pieces of foam rubber that encompass the pole.

6. The carrier of claim 5 wherein the pole is made of two to six sections.

7. The carrier of claim 1 additionally comprising a container for transporting the pole sections and straps.

8. The carrier of claim 7 additionally comprising a brightly-colored sheet of material for wrapping around the trunk of the carcass to reduce the risk of being accidentally shot by other hunters and to prevent contamination of the trunk cavity of the carcass.

* * * * *